United States Patent Office 3,002,984
Patented Oct. 3, 1961

3,002,984
PROCESS FOR THE PREPARATION OF 11-HYDROXY-STEROIDS
Stefan Antoni Szpilfogel, Oss, Netherlands, assignor to Organon Inc., West Orange, N.J., a corporation of New Jersey
No Drawing. Filed Apr. 29, 1959, Ser. No. 809,595
Claims priority, application Netherlands May 12, 1958
1 Claim. (Cl. 260—397.45)

The invention relates to a process for the preparation of $\Delta^{1,4}$-3,20-dioxo-11$\beta$-hydroxy-steroids from $\Delta^{1,4}$-3,11,20-trioxo-steroids.

More particularly it relates to a process for the preparation of $\Delta^{1,4}$-3,20-dioxo-11-hydroxy-steroids, which in 6-position are substituted by a chloro or fluoro atom and which may also have substituents in other positions.

It is known that an 11-oxo group is far less reactive in regard to reduction agents than oxo groups in other positions in the steroid molecule. If therefore one wants to carry out a selective reduction of the 11-oxo group in steroids which have in addition oxo groups in other positions, for example in the positions 3 and 20, it is necessary that the latter groups are temporarily protected.

Such a protection can be carried out for example by reacting a 3,11,20-trioxo-steroid compound with a derivative of hydrazine, such as phenylhydrazine or semicarbazide, in which the 3 and 20-oxo groups are converted into a hydrazone grouping and the 11-oxo group remains unattacked. Then the 11-oxo group is reduced to an 11-hydroxy group by means of a suitable reduction agent, such as an alkalimetal borohydride, after which the protected 3 and 20-oxo groups are liberated again by means of an acid. Such a process is described for example in the United States Patent 2,628,966.

It is also known that a halogen substituent, which is situated in the $\alpha$-position in regard to the 3-oxo group, or in the $\alpha$-position in regard to a double bond conjugated with the 3-oxo group, is split off under the influence of a derivative of hydrazine while forming an $\alpha,\beta$-unsaturated, or $\alpha,\beta$-$\gamma$-unsaturated 3-hydrazone. Consequently, if one wants to protect temporarily the 3-oxo group in steroids which have a halogen atom in the 2 and/or 4 position, by hydrazone formation, the 3-oxo group will not only be blocked in the reaction with a derivative of hydrazine, but at the same time splitting off of hydrohalide will take place while forming a double bond between the carbon atoms 1 and 2 and/or 4 and 5, see for example J. Am. Chem. Soc. 77, 4781 (1955).

In case start is made from 3-oxo-steroids which are substituted by halogen in the 2 and/or 4 positions, the above described splitting off of hydrohalide occurring as subsequent reaction can be of great advantage because the introduction of the double bonds in question is, in most of the cases, even desirable.

Such a desired subsequent reaction also occurs on reacting the known 6-bromo-cortisone acetate with for example semicarbazide, in which splitting off of hydrobromide occurs and the 3-semi-carbazone of $\Delta^6$-cortisone acetate is formed.

However, in those cases where it is of importance that the halogen substituent present is maintained, the occurrence of such a subsequent reaction is naturally most undesirable. This occurs for example in the reaction of $\Delta^4$-3,11,20-trioxopregnene compounds which are substituted in 6-position by a chloro or fluoro atom with a derivative of hydrazine.

These $\Delta^4$-6-halo-pregnene compounds which have not yet been described in the literature, are of great importance as intermediates for the preparation of the corresponding biologically active $\Delta^1$-steroids. They can be prepared by starting from $\Delta^4$-3,11,20-trioxo-steroids, ketalizing these in a known manner in 3-position, or in the positions 3 and 20, in which the 4-5 double bond shifts to the 5-6 position, subsequently oxidizing the resulting compounds with for example chromium-trioxide, and finally treating the thus obtained 5$\alpha$,6$\alpha$-oxido compounds with hydrochloric or hydrofluoric acid, in which the corresponding $\Delta^4$-3,11,20-trioxo-6-halo-pregnene compounds are obtained.

The above described process for the introduction of a 6-halogen atom into 11-hydroxy-steroids having proved to be unsuitable owing to the instability of the 11-hydroxyl group in regard to acid reagents which have to be used in the present process, it has been tried to prepare the 6-halo-11-hydroxypregnene compounds by selective reduction of the corresponding 6-halo-11-oxo compounds.

It has appeared that this method cannot be applied to $\Delta^4$-3,11,20-trioxo-6-halo-steroids, because by means of a derivative of hydrazine not only the desired protection of the 3 and 20-oxo group is obtained, but that at the same time, under the influence of the hydrazine derivative the 6-halogen atom is split off while forming a double bond between the carbon atoms 6 and 7.

It was surprisingly found that $\Delta^{1,4}$-3,11,20-trioxopregnadiene compounds which are substituted in 6-position by a chloro or fluoro atom and which may at the same time have substituents in other positions, can be converted into the corresponding 3,20-dihydrazones by means of a derivative of hydrazine, without splitting off of the 6-halogen atom occurring.

Then the thus prepared compounds can be reduced selectively to the corresponding 11-hydroxy-steroids, after which the protected oxo groups in the 3 and 20 positions are set free again in a known manner.

The $\Delta^{1,4}$-3,11,20-trioxo-6-halo-pregnadiene compounds to be applied as starting products in the present process can be prepared by introducing in a known manner a double bond between the carbon atoms 1 and 2 in the above described $\Delta^4$-3,11,20-trioxo-6-halo-pregnene compounds.

In addition to the already mentioned substituents the starting products may also contain one or more free or functionally converted hydroxyl and oxo groups, lower alkyl groups and halogen atoms.

The introduction of the hydrazone groupings takes place by reacting the starting product with a derivative of hydrazine, such as phenylhydrazine, dinitrophenylhydrazine, semicarbazide and the like, or a functional derivative, such as acid salts hereof, in the presence of a suitable solvent.

As solvents may be applied a lower aliphatic alcohol, such as methanol, ethanol, and t-butanol, a halogenated hydrocarbon, such as chloroform and dichloroethane, a lower aliphatic carboxylic acid, such as acetic acid, a substituted acid amide, such as dimethyl formamide and dimethyl acetamide, an ether, such as dioxane and tetrahydrofurane, or mixtures of these solvents. The reaction is preferably carried out in acetic acid.

The thus obtained 3,20-dihydrazones of $\Delta^{1,4}$-3,11,20-trioxo-6-halo-pregnadiene compounds can be converted, in a known manner, into the desired $\Delta^{1,4}$-3,20-dioxo-11-hydroxy-6-halo-pregnadiene compounds, for example according to the method described in J. Am. Chem. Soc. 77, 4781 (1955), by reduction of the 11-oxo group and a subsequent treatment with acid or by an exchange reaction with certain oxo compounds, such as pyruvic acid. If the reduced compound is substituted by a free hydroxyl group in 21-position, it is recommendable to esterify this group before the splitting off of the hydrazone groupings is carried out.

The reduction is preferably carried out with an alkalimetal borohydride, such as sodium borohydride. In order to prevent that the 6-halogen atom is split off during the reduction, it is required that the reaction take place at not too high a temperature.

The reduction is preferably carried out at a temperature which lies below 20° C.

The following examples illustrate the invention.

*Example Ia*

15.8 g. of semicarbazide are added to a solution of 13.16 g. of 6α-chloro-prednisone in 275 ml. of dioxane and 50 ml. of acetic acid. The solution is left to stand at 20° C. for 12 hours, after which it is evaporated in vacuo at a temperature of 50° C. to a volume of 140 ml. 500 ml. of water are added to the remaining solution, after which the mixture is cooled to —5° C.

The formed precipitate is filtered off, washed with water and then dried, in which 14.71 g. of dry substance are obtained. By extracting the aqueous layer with ethyl acetate another 0.29 g. of the 3,20-disemicarbazone of 6-chloro-prednisone is obtained.

*Example Ib*

500 mg. of the 3,20-disemicarbazone of 6-chloro-prednisone are dissolved in 25 ml. of tetrahydrofurane and 2.5 ml. of water. In nitrogen atmosphere the solution is cooled to 0° C., after which 55 mg. of sodium borohydride are added. Subsequently the solution is stirred at 0° C. for 1 hour, after which 0.3 ml. of acetic acid is added to decompose the excess of the reduction agent. Then the solvent is evaporated in vacuo to nearly dryness at a temperature of 25° C., after which 10 ml. of water are added to the remaining solution. The solution is then cooled to 0° C. and filtered. The filtered compound is washed with water and then dried in vacuo at 20° C.

*Example Ic*

450 mg. of the compound obtained according to Example Ib are dissolved in 2.5 ml. of pyridine and 2.5 ml. of acetic anhydride. The solution is left to stand at room temperature for 24 hours and is then evaporated in vacuo to a small volume at a temperature of 30° C. 10 ml. of water are added to the remaining solution, after which the mixture is cooled to 0° C. The formed precipitate of the 3,20-disemicarbazone of 6α-chloro-prednisolone-21-acetate is filtered off, washed with water and dried in vacuo at 20° C.

*Example Id*

2.5 ml. of pyruvic acid are added to a solution of 450 mg. of the compound obtained according to Example Ic in 5 ml. of dioxane, 5 ml. of water and 5 ml. of acetic acid. This solution is maintained at room temperature for 24 hours, after which it is evaporated in vacuo to a small volume at a temperature of 35° C. 20 ml. of water are added to the remaining solution, after which the mixture is extracted with ethyl acetate. The extract is washed with a 5% sodium hydroxide solution, then with a 5% sodium bicarbonate solution, and finally with water. The extract is subsequently dried on sodium sulphate and evaporated to dryness. The residue is dissolved in chloroform and then chromatographed over silica gel, after which elution is carried out with chloroform containing 5 to 10% acetone. The eluate is evaporated to dryness and the residue is crystallized from a mixture of acetone and hexane, in which the 6α-chloro-prednisolone-21-acetate is obtained.

Analogously to the above described method the $\Delta^{1,4}$-3,11, 20 - trioxo-16,17α,21-trihydroxy-6α-chloro-pregnadiene is converted into the corresponding 11-hydroxy compound.

*Example II*

A mixture of 2 g. of 6α-fluoro-16α-methyl-prednisone, 1 g. of semicarbazide hydrochloride, 45 ml. of methanol and 0.8 g. of anhydrous sodium acetate was kept for 30 hours at room temperature, ice cold saturated aqueous sodium chloride solution was added and the product was extracted with ethyl acetate. The extract was washed to neutral, dried and evaporated to dryness under reduced pressure. The residue consisted of the 3,20-disemicarbazone of 6α-fluoro-16α-methyl prednisone.

A solution of 1.75 g. of the above disemicarbazone in 40 ml. of dioxane was treated with a solution of 0.85 g. of sodium borohydride in 10 ml. of water and the mixture was kept at room temperature for 18 hours. It was then acidified with acetic acid, a few drops of pyridine was added, most of the solvent was evaporated under reduced pressure and the residue was diluted with water. The product was extracted with ethyl acetate, the extract was washed with water, dried over sodium sulphate and evaporated to dryness under reduced pressure. The residue crystallized from aqueous methanol containing a few drops of pyridine, to give the 3,20-disemicarbazone of 6α-fluoro-16α-methyl prednisolone.

A mixture of 1 g. of this compound, 5 ml. of pyridine and 1 ml. of acetic anhydride was kept for 6 hours at room temperature, poured into water and the precipitate formed was collected by filtration, washed with water, dried and recrystallized from aqueous methanol. There was thus obtained the 3,20-disemicarbazone of 6α-fluoro-16α-methyl prednisolone-21-acetate.

A mixture of 1 g. of this compound, 5 ml. of glacial acetic acid, 1.5 ml. of water and 0.85 g. of 50% pyruvic acid was stirred at room temperature for 24 hours; water was added until complete precipitation, little by little and with stirring, and the mixture was kept in the refrigerator for 1 hour. The precipitate was collected, washed with water, dried and recrystallized from acetone-hexane. There was thus obtained 6α-fluoro-16α-methyl prednisolone-21-acetate.

The method of the previous example was applied to 6α-chloro-16β-methyl-prednisone and to 6α,9α-difluoro-16α-hydroxy-prednisone, to produce 6α-chloro-16β-methyl-prednisolone-16,21-diacetate and 6α,9α-difluoro-16α-hydroxy-prednisolone-16,21-diacetate.

I claim:

Process for the preparation of a $\Delta^{1,4}$-3,20-diketo-11-hydroxy-6-halo-steroid which comprises reacting a $\Delta^{1,4}$-3,20-diketo-11-keto-steroid, which is substituted in the 6-position by a halogen atom selected from the group consisting of chlorine and fluorine with a hydrazine derivative selected from the group consisting of phenylhydrazine, dinitrophenylhydrazine, semicarbazide, and the acid salts thereof, in the presence of an organic solvent, reducing the 11-keto group to an 11-hydroxy group at a temperature below about 20° C., and then setting free the keto groups in the 3- and 20-positions.

References Cited in the file of this patent

UNITED STATES PATENTS 2,924,612   Hirschmann et al. _____ Feb. 9, 1960

FOREIGN PATENTS 773,016   Great Britain _____ Apr. 17, 1957